United States Patent

[11] 3,578,014

[72] Inventor Jean Gachot
 179 Avenue de la Division Leclerc,
 Enghien, (Val d'Oise), France
[21] Appl. No. 821,006
[22] Filed May 1, 1969
[45] Patented May 11, 1971
[32] Priority May 9, 1968, Nov. 28, 1968
[33] France
[31] 151,139 and 175,674

[54] PRESSURE REGULATOR FOR PRESSURIZED-FLUID CIRCUITS
 9 Claims, 11 Drawing Figs.

[52] U.S. Cl. .................................................. 137/108,
 137/115, 137/119
[51] Int. Cl. .................................................. G05d 16/06
[50] Field of Search .......................................... 137/102,
 108, 115, 118, 119, 116

[56] References Cited
UNITED STATES PATENTS
3,149,475 9/1964 Gislason ..................... 137/118

Primary Examiner—Laverne D. Geiger
Assistant Examiner—William H. Wright
Attorney—Young and Thompson ABSTRACT: Regulator for a pressurized-fluid circuit supplied by a pressure-elevating apparatus such as a compressor, said regulator comprising a measuring chamber which communicates with the fluid circuit and is provided with a pressure-gauge element for measuring the pressure within said fluid circuit, and a regulating chamber which is connected to the pressure-elevating apparatus and has an orifice for the admission of the fluid in the direction of the measuring chamber, a low-pressure discharge orifice and means actuated by the pressure-gauge element in order to shut off the discharge orifice when the pressure of the reservoir is lower than a minimum value and to open said orifice when the pressure of the reservoir is higher than a maximum value. The admission orifice and discharge orifice are located in oppositely-facing relation and the regulating chamber comprises a two-position obturator which is connected directly to the pressure-gauge element and selectively closes the admission orifice or the discharge orifice according as the pressure within the fluid circuit attains either the maximum or minimum value.

According to a preferred embodiment, the discharge orifice of the regulating chamber opens into a reaction chamber having an orifice which provides a communication with the atmosphere, means being additionally provided for producing a timelag between connection of said reaction chamber to the atmosphere and opening of the discharge orifice of the regulating chamber.

PATENTED MAY 11 1971 3,578,014

INVENTOR
JEAN GACHOT
By Young & Thompson
Attys.

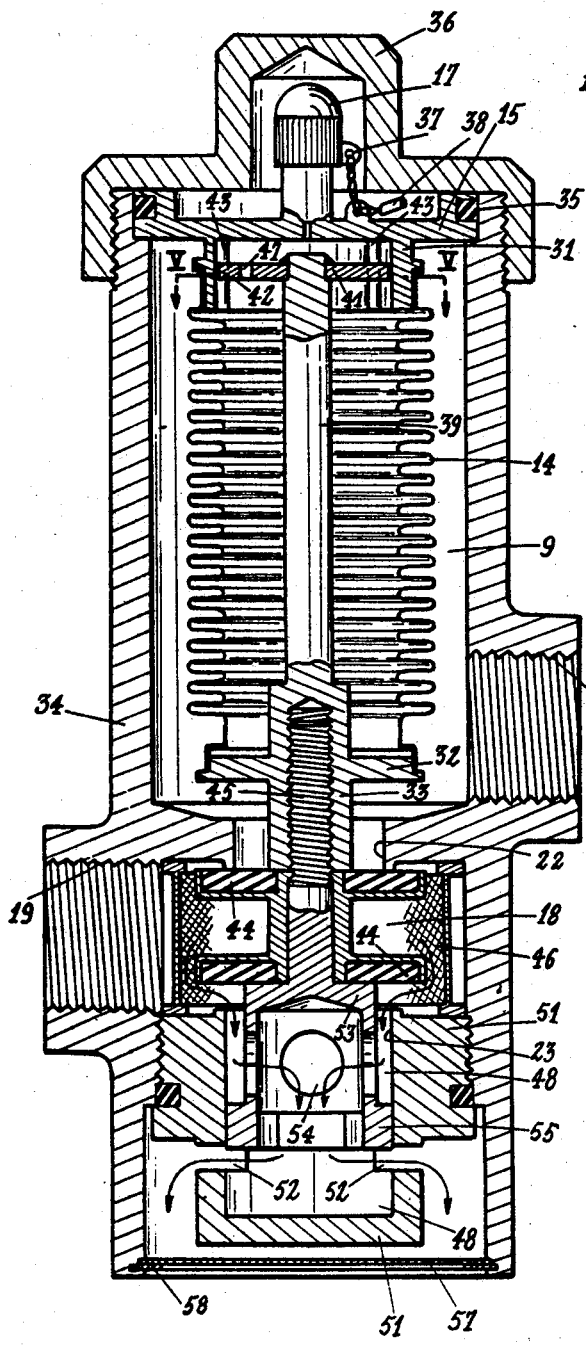
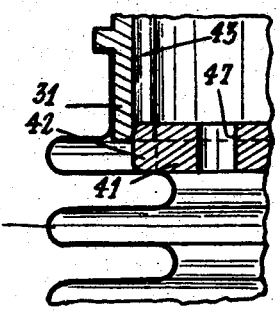
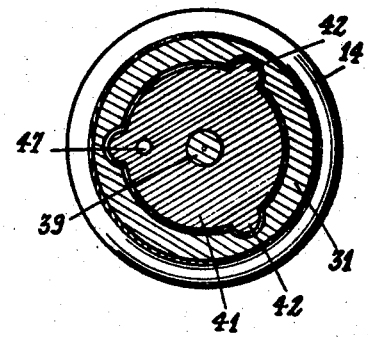
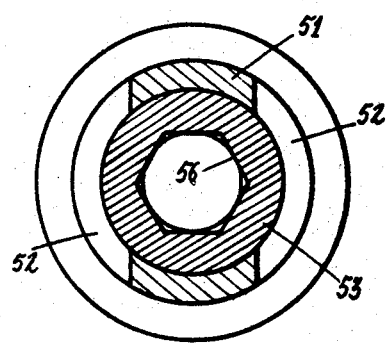

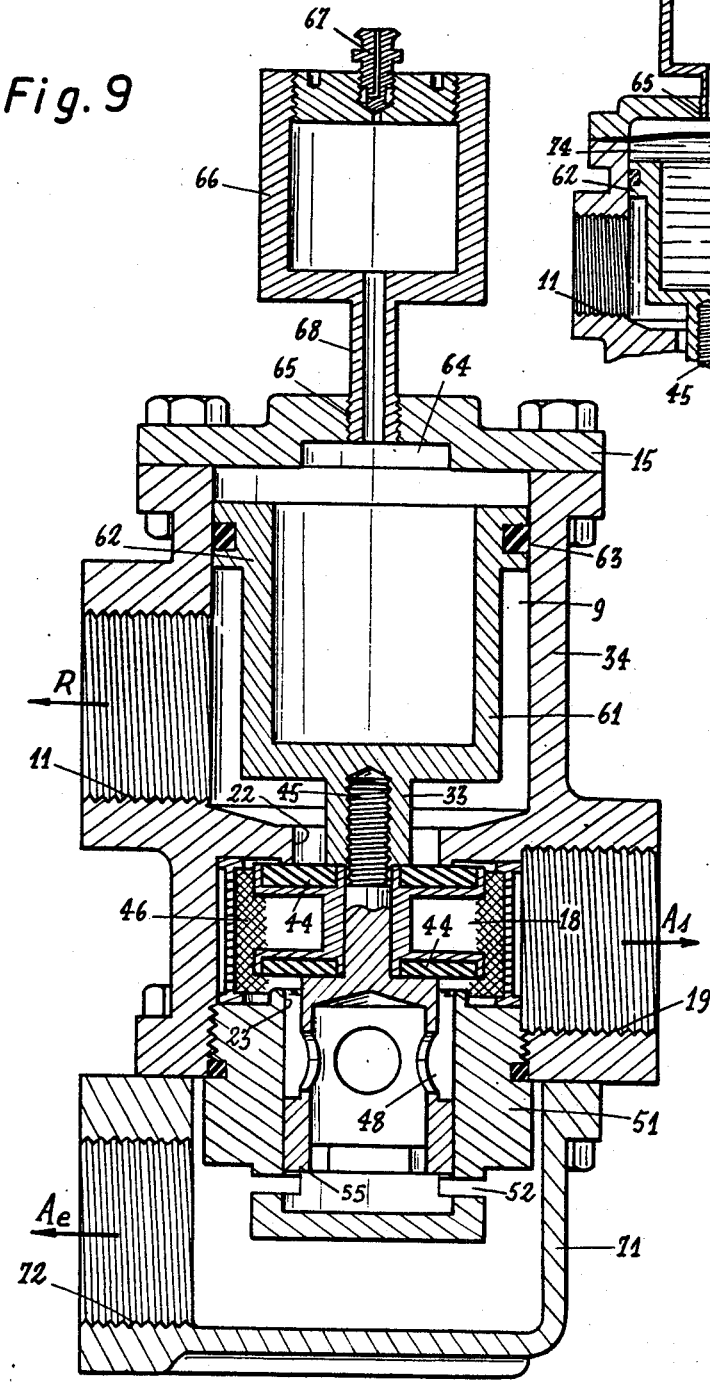
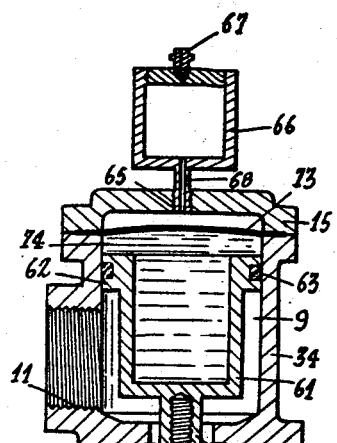

PRESSURE REGULATOR FOR PRESSURIZED-FLUID CIRCUITS

The present invention relates to a pressure regulator which is adaptable to a circulation system containing a fluid under pressure and especially a gas such as air, this invention being more especially applicable to the case in which the system comprises one or a number of reservoirs containing compressed air (or any other gas), said reservoirs being supplied with air by a compressor.

It is known that road or railway vehicles are provided with compressed air reservoirs which serve primarily to actuate air brakes. Public work contractors usually make use of reservoirs of this type for the purpose of feeding pneumatic machines or tools. In these applications, the reservoir is supplied with air by a compressor which operates continuously for reasons of convenience. A pressure regulator is placed between the compressor and the reservoir so as to connect the compressor to the reservoir when the pressure within this latter falls below a minimum value and so as to connect the compressor to the surrounding atmosphere when the pressure within the reservoir attains a predetermined maximum value.

It is known to employ in pressure regulators of this type a gauge element which measures the pressure within the reservoir. Said pressure-gauge element comprises a metallic diaphragm which is loaded by an oppositely-acting calibrated spring. The regulator additionally comprises a pneumatic amplifier controlled by the pressure gauge and adapted to actuate a valve for connecting to the atmosphere when the pressure within the reservoir exceeds a maximum value. A check valve is mounted within the pipe which connects the regulator to the reservoir in order to isolate this latter from atmosphere.

Regulators of this type comprise a large number of components which are fragile and difficult to adjust, thereby resulting in a high cost price as well as entailing both delicate and costly maintenance. Moreover, the metallic diaphragm has a certain degree of stiffness which affects the operation of the pressure guage and varies from one component to another and also in the course of time in the case of any one component. These regulators consequently achieve a low standard of accuracy and fidelity.

The aim of the present invention is to circumvent the disadvantages noted in the foregoing by providing a pressure regulator with a small number of components of rugged construction which are not liable to get out of order.

The pressure regulator which is contemplated by the invention and adaptable to a pressurized-fluid circuit which is supplied by a pressure-elevating apparatus is of the type comprising a measuring chamber which communicates with the fluid circuit and is provided with a pressure-gauge element for measuring the pressure within said fluid circuit and a regulating chamber which is connected to the pressure-elevating apparatus and has an orifice for the admission of the fluid in the direction of the measuring chamber, a low-pressure discharge orifice and means actuated by the pressure-gauge element in order to shut off the discharge orifice when the pressure of the reservoir is lower than a minimum value and to open said orifice when the pressure of the reservoir is higher than a maximum value. In accordance with the invention, said regulator is characterized in that the admission orifice and discharge orifice are located in oppositely-facing relation and that the regulating chamber comprises a two-position obturator which is connected directly to the pressure-gauge element and selectively closes the admission orifice or the discharge orifice according as the pressure within the fluid circuit attains either the maximum or minimum value.

The number of parts constituting the regulator is thus reduced to a minimum, thereby reducing the cost price. Adjustments carried out during manufacture are also minimized and maintenance during use is greatly facilitated.

In a preferred embodiment of the invention which is particularly suitable for use when the fluid to be controlled is a gas delivered by a reservoir which is pressurized by a compressor, the pressure-gauge element comprises a bellows-type diaphragm which is subjected on one side to the pressure of the compressed-gas reservoir and on the other side to a predetermined oppositely-acting force. Said oppositely-acting force is produced either by a calibrated spring or by a pressure of gas contained within the bellows diaphragm.

It is thus possible to employ a diaphragm which has a very high degree of flexibility and the stiffness of which does not affect the operation of the regulator. In consequence, accuracy and fidelity of the apparatus are enhanced.

In a preferred embodiment of the invention, the discharge orifice of the regulating chamber opens into a reaction chamber which is put into communication with the low-pressure fluid circuit and especially with the surrounding atmosphere after a predetermined timelag with respect to the opening of the discharge orifice.

The reaction which is thus obtained in the pressure-gauge obturator accelerates its motion and also facilitates the discharge of traces of oil or water contained in the air which is blown in by the compressor.

In the case of the embodiment contemplated earlier in which the pressure-gauge element of the regulator comprises a bellows diaphragm which is subjected on one side to the fluid pressure and on the other side to a predetermined oppositely-acting force, experience has shown that this regulator also operates in a satisfactory manner when the fluid to be controlled is a liquid under pressure, the field of application of the regulator being accordingly extended to an appreciable degree. However, the pressures employed in circulation systems for liquids are frequently higher than the diaphragm bellows element is designed to withstand.

In consequence, it is an aim of the invention to provide the regulator with pressure-gauge elements which exhibit reliable operation within the usual pressure limits of hydraulic circuits while remaining serviceable in the case of compressed-air systems of the type normally encountered.

To this end, the pressure-gauge element is preferably provided with a wall which is integral with the obturator and capable of displacement within the measuring chamber, one of the faces of said wall being subjected to the pressure of the fluid of the circulation system whilst the other face is subjected to a predetermined reference pressure.

Under these conditions, the gauge element still operates in a satisfactory manner when the pressure of the reservoir attains values to which no bellows element would be capable of withstanding.

In a preferred embodiment, the reference pressure which is exerted on the movable wall of the gauge element is the pressure of a compressed gas which is stored within an auxiliary chamber which communicates with the measuring chamber or, alternatively, said reference pressure can be that of a liquid which is separated by a resilient wall from an enclosure which contains a compressed gas.

In another advantageous embodiment, the gauge element comprises a diaphragm which is secured to the obturator, one of faces of said diaphragm being subjected to the pressure of the reservoir and the other face being subjected to an adjustable elastic force. This force can be developed in particular as the result of contact with an elastically deformable body which is also applied against an adjustable stop. By this means, the operating pressure of the regulator can easily be regulated.

Further properties of the invention will also be brought out by the description which now follows below, reference being made to the accompanying drawings in which a number of different characteristic embodiments of the invention are illustrated by way of example without any intended limitation, and in which:

FIG. 3 is an axial sectional view of an industrial design of regulator in accordance with the invention, said regulator being shown in the position of connection of the compressor to the atmosphere;

FIG. 5 is a diametral sectional view taken along line V–V of FIG. 3;

FIG. 6 is an enlarged view of a detail of FIG. 3

FIG. 8 is a diametral sectional view along line VIII–VIII of FIG. 4;

FIG. 9 is an axial sectional view of a regulator having a movable wall and showing said regulator in the position of closure of the orifice which provides admission to the measuring chamber;

FIG. 10 is an axial sectional view of another movable wall regulator showing this latter in the same position as FIG. 9;

Figure 1:
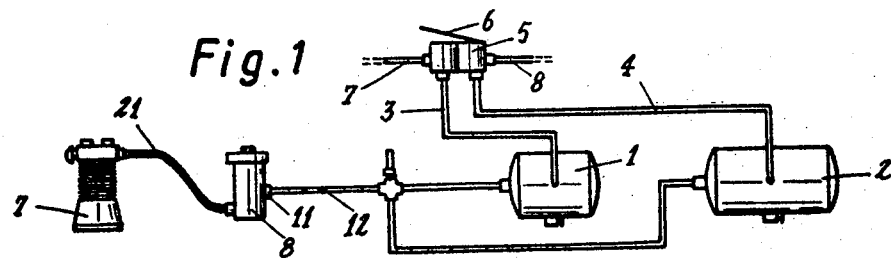
FIG. 1 is a diagram showing the position of the regulator in a compressed-air brake installation.

There is shown in FIG. 1 the pneumatic diagram of an installation which is mounted on board a vehicle for the operation and control of compressed air brakes. The installation comprises a compressed air reservoir 1 for the supply of the front-axle brakes and a reservoir 2 for the supply of the rear brakes. These reservoirs are connected by means of the pipes 3 and 4 to a control valve 5 having a double casing and actuated by a pedal 6. In the brake application position, the valve 5 connects the reservoirs 1 and 2 to the front and rear brake cylinders (not shown) by means of pipes 7 and 8. The reservoirs 1 and 2 are supplied with compressed air by a compressor 7 which operates continuously. A pressure regulator 8 is interposed between the compressor 7 and the reservoirs 1 and 2. When the pressure within the reservoirs 1 and 2 exceeds a predetermined maximum value P, the regulator 8 puts the compressor 7 into communication with the atmosphere and isolates the reservoirs 1 and 2. When the pressure within the reservoirs 1 and 2 falls below a predetermined minimum value $p$ as a result of repeated application of the brakes, the regulator 8 again connects the compressor 7 to the reservoirs 1 and 2.

Figure 2:
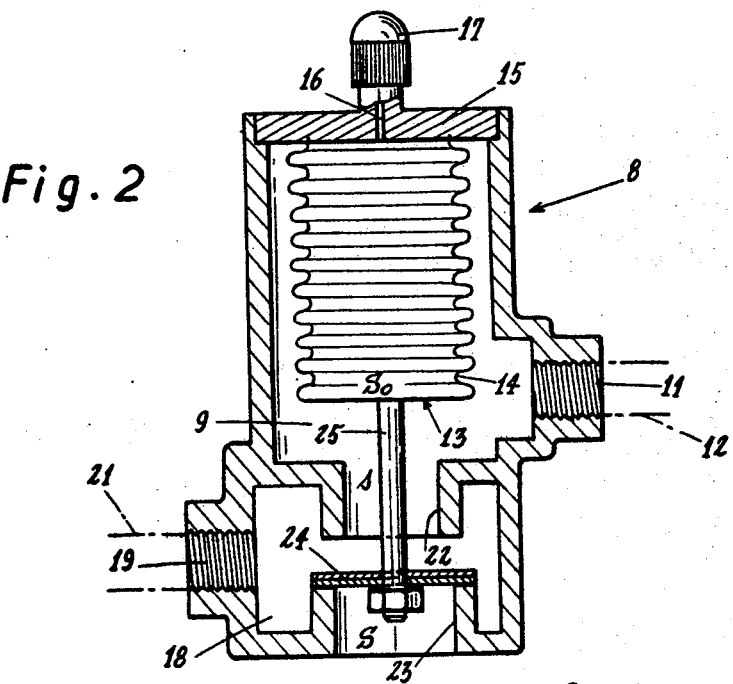
FIG. 2 is a diagrammatic sectional view of a regulator in accordance with the invention.

The essential features of the pressure regulator 8 in accordance with the invention are shown in FIG. 2. This regulator 8 comprises a measuring chamber 9 provided with an orifice 11 in which is screwed the pipe 12 for supplying the reservoirs 1 and 2 with compressed air. There is mounted within said measuring chamber 9 a pressure-gauge element 13 which consists of a bellows diaphragm 14 and this latter is tightly welded to the end plate 15 of the chamber 9. The exterior of the diaphragm 14 is subjected to the pressure developed within the reservoirs 1 and 2 whereas said diaphragm is subjected internally thereof to a predetermined oppositely-acting force which, in the diagram presented in the drawings, is exerted by a gas under pressure contained within the diaphragm 14. A duct 16 is pierced through the end plate 15 and terminates in a filling valve 17 of the automatic closure type. The diaphragm 14 is filled with air or with gas at a reference pressure $P_o$.

The regulator 8 additionally comprises a regulating chamber 18 having an orifice 19 in which is screwed a pipe 21 providing a connection with the compressor 7. The chamber 18 is also provided with an orifice 22 for admission to the measuring chamber 9 and an orifice 23 for discharge to the atmosphere. In accordance with the invention, the orifices 22 and 23 are located in oppositely-facing relation so that they can be selectively shut off by means of single obturator. Said obturator is constituted by a valve-disc 24 fixed at the extremity of a stem 25 which is directly welded to the diaphragm 14.

In the present invention, it is intended that the size of the admission orifice 22 and discharge orifice 23 should be such that the pressure within the reservoirs 1 and 2 is maintained between the maximum value P and the minimum value $p$.

More precisely, if $So$ designates the effective cross section of the bellows diaphragm 14, and S designates the cross section of the discharge orifice 23, steps are taken to obtain the following relation: $S/so = (P-Po) / (P-A)$ wherein A designates the atmospheric pressure. In other words, the ratio of the cross section S of the discharge orifice 23 to the cross section of the diaphragm 14 is equal to the ratio of the differences in the pressure P relative to the reference pressure and to the atmospheric pressure.

Similarly, if $s$ designates the cross section of the admission orifice 22, steps are taken to obtain the following relation: $s/So = (p+Po)/(p-A)$. In other words, the ratio of the cross section of the admission orifice 22 to the effective cross section of the diaphragm 14 is equal to the ratio of the differences in pressure $p$ relative to the reference pressure and to the atmospheric pressure.

The regulator 8 operates as follows:

when the pressure within the reservoirs 1 and 2 is lower than the minimum value $p$, the force of expansion of the gas contained within the diaphragm 14 is predominant and the valve-disc 24 is applied against the discharge orifice 23 as in shown in FIG. 2. The admission orifice 22 is therefore open and the compressor 7 delivers into the reservoirs 1 and 2, thereby increasing the pressure within said reservoirs. When said pressure attains the maximum value P, the force which holds the valve-disc 24 applied against the discharge orifice 23 is reduced to zero by virtue of the relation given hereinabove. The valve-disc 24 is upwardly displaced under the action of atmospheric pressure and is attracted by the diaphragm 14 so as to close off the admission orifice 22. The reservoirs 1 and 2 are thus isolated from the compressor 7 and this latter delivers directly to the surrounding atmosphere through the orifice 23.

After a number of brake applications, the pressure within the reservoirs 1 and 2 decreases. When said pressure attains the minimum value $p$, the force of expansion of the gas contained within the diaphragm 14 again becomes predominant and the valve-disc 24 is again applied against the discharge orifice 23. The compressor 7 causes the pressure to rise again within the reservoirs until said pressure reaches the maximum value P and the same cycle begins again.

Referring now to FIGS. 3 to 8, an industrial design of the regulator in accordance with the invention will now be described. In these FIGS., the same components as those shown in FIGS. 1 and 2 are designated by the same reference numerals. The bellows diaphragm 14 is welded to a cylindrical head 31 which is in turn welded to the end plate 15 of the measuring chamber 9. Said end plate 15 carries a filling valve 17 which is of the same type as the valves employed for inflating the tires of motor vehicles. At the other extremity, the diaphragm 14 is welded to a plug 32 which carries a threaded endpiece 33. The diaphragm 14, the plug 32, the head 31 and the end plate 15 constitute a detachable leak-tight assembly which serves to fill the diaphragm 14 either with air or gas prior to mounting said diaphragm on the regulator. Leak-tightness between the end plate 15 and the body 34 of the regulator 8 is ensured by means of an O-ring seal 35. The valve 17 is protected by means of a cover 36. Lugs 37 carried by the end cap of the valve 17 and the plate 15 serve to attach a safety lead seal 38.

Within the interior of the diaphragm 14, the plug 32 carries an axial rod 39 at the extremity of which is welded a guide washer 41 which is slidably fitted inside the head 31. The washer 41 is of circular section and has three bosses 42 (as shown in FIGS. 5 and 6) which are located at 120° relative to each other and slidably fitted within grooves 43 formed within the interior of the head 31. A hole 47 is formed through the washer 41 for the flow of gas.

The regulating chamber 18 contains a double valve 44 which is secured to the endpiece 33 of the diaphragm 14 by means of a threaded rod 45 which is screwed into said endpiece. The chamber 18 is surrounded by a cylindrical filter 46.

Figure 7:
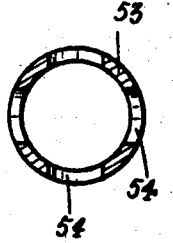
FIG. 7 is a diametral sectional view taken along line VII–VII of FIG. 4.
Figure 4:
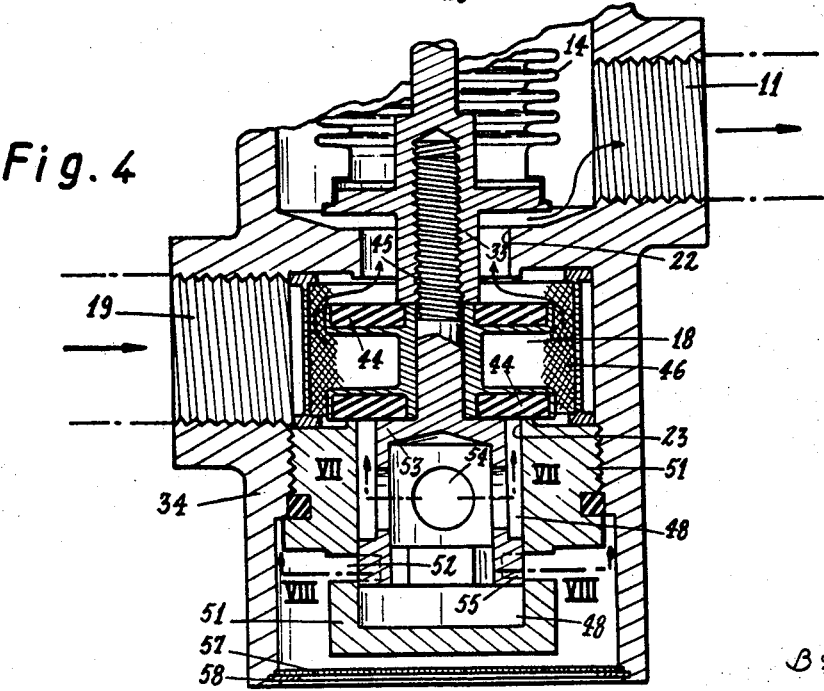
FIG. 4 is a fragmentary sectional view showing the regulator of FIG. 3 in the position corresponding to filling of the reservoir by the compressor.

In this industrial form of construction, the discharge orifice 23 of the regulating chamber 18 opens into a reaction chamber 48 having a cylindrical volume which is formed within the interior of a plug 51 which is screwed into the body 34 of the regulator. Said plug is provided with two slots 52 (as shown in FIG. 8) which serve to establish a communication between the reaction chamber 48 and the atmosphere. A hollow piston 53 is displaceable within the interior of the chamber 48 and is secured to the double valve 44, the wall of said piston being pierced by four holes 54 (as shown in FIG. 7) which are spaced at 90° relative to each other. The end of the piston 53 is provided with an annular flange 55 which is adapted in substantially leak-tight manner to the internal diameter of the chamber 48. The length of the piston 53 is such that, when the valve 44 is applied against the discharge orifice 23, the annular flange 55 closed off the slots 52, as shown in FIG. 4. The internal wall of the piston 53 has a hexagonal portion 56 as shown in FIG. 8 so that the rod 45 may be screwed into the endpiece 33 of the diaphragm 14.

The lower portion of the body 34 is closed by means of a filter 57 which is held in position by means of a snapring 58.

The function of the reaction chamber 48 is as follows:

If it is assumed that the pressure within the reservoirs is lower than the maximum value P, the valve 44 is applied against the discharge orifice 23 as shown in FIG. 4 and the annular flange 55 seals off the slots 52. If the pressure within the reservoirs rises and attains the maximum value P, the valve 44 is dislodged from the orifice 23 and the pressure of the reservoirs is established within the reaction chamber 48 which is still isolated from the atmosphere by means of the annular flange 55. Inasmuch as both faces of the valve 44 are subjected to the same pressure, the air contained within the chamber 9 can cause the contraction of the bellows diaphragm 14 and the valve 44 is abruptly applied against the admission orifice 22. The annular flange 55 frees the slots 52 and the air contained within the chambers 18 and 48 passes out abruptly to the atmosphere, thereby carrying away the particles of oil, water or impurities which have been fed in by the compressor.

It is apparent from the foregoing description that the advantages of the regulator in accordance with the invention lie mainly in its ruggedness and simplicity. The moving parts are limited to a valve and a piston which is rigidly fixed to said valve. These components do not call for any adjustment either during manufacture or during use, the only condition which is required of the valve being to ensure fluidtight closure of the admission and discharge orifices.

The mechanical characteristics of the bellows diaphragm do not play any part in the operation by reason of the high flexibility of this latter. The guide washer 41 prevents any torsional strain by means of its bosses 42 and also prevents any excessive extension of the diaphragm by being applied against the last fold of the said diaphragm. A long service life of the diaphragm 14 is thus ensured.

By virtue of the reaction chamber 48 the regulator has a very short response time and automatic discharge of impurities is additionally obtained.

It is to be understood that the invention is not limited to the embodiment hereinabove described and that any number of alternative forms of execution of this latter may accordingly be contemplated without thereby departing from the purview of this invention. In particular, it would be possible to produce the oppositely-acting force which is applied to the diaphragm 14 by means of a calibrated spring mounted within the interior of said diaphragm.

Referring to FIG. 9, there is shown in a different embodiment the measuring chamber 9 of the regulator which is provided with an orifice 11 through which said regulator is adapted to communicate with a reservoir R or any circulation system (not shown in the drawings) which contains a fluid under pressure. The chamber 9 is closed by the end plate 15.

The regulator also comprises a regulating chamber 18 having an orifice 19 through which said chamber communicates by way of the outlet As with the circulation system of an apparatus for increasing the pressure of circulating fluid (not shown in the drawings).

The body of the regulator also has an orifice 22 for providing admission to the measuring chamber 9 and an orifice 23 for discharging the fluid towards the inlet of the pressure-elevating apparatus. The orifices 22 and 23 can be selectively shut off by the double obturator 44 which is secured to an endpiece 33 by means of a threaded rod 45. The chamber 18 is surrounded by a protective filter 46. The discharge orifice 23 opens into a reaction chamber 48 formed within the interior of a plug 51 which is screwed into the regulator body 34. Said plug 51 is provided with two slots 52 which can be either uncovered or on the contrary closed by an annular flange 55 which performs the function of a slide-valve and is slidably mounted within the bore 23 of the chamber 48 and which is integral with the double obturator 44. The slots 52 are freed when the admission orifice 22 is shut off by the double obturator 44.

In accordance with the invention, the endpiece 33 which carries the double obturator 44 is integral with a hollow piston 61 which is capable of displacement within the interior of the measuring chamber 9.

The base of the piston 61 is provided with an annular shouldered portion 62, the external diameter of which is equal to the internal diameter of the chamber 9 and fitted with an annular seal 63. The end plate 15 of the regulator is provided with a recess 64 pierced by an internally threaded bore 65 into which is screwed a tube 68 carrying auxiliary chamber 66 which is fitted with a valve 67 for the admission of compressed gas.

There is fixed at the lower end of the body 34 a cap 71 which has an internally threaded bore 72. Said bore is provided for the purpose of coupling a pipe which is connected to the inlet Ae of the pressure-elevating apparatus. When the circulating fluid is air, the orifice 72 opens to free air or is alternatively fitted with an air filter.

In this embodiment, the hollow piston 61 performs the same functions as the bellows diaphragm 14 which is employed in the first embodiment; the reference pressure which causes the release of the double obturator 44 is the same as the pressure which prevails within the auxiliary chamber 66 and the hollow piston 61; but the pressure which is exerted on said hollow piston 61 can attain the high values employed in the hydraulic control circuits without any difficulty. It is also possible to reduce the cross-sectional area of the piston by increasing the difference between the maximum pressure and the reference pressure, thereby producing a device which is of smaller overall size.

In the case of the embodiment illustrated in FIG. 10, a flexible wall 73 is disposed in leak-tight manner between the hollow piston 61 and the end plate 15. The space formed between the flexible wall 73 and the hollow piston 61 is filled with a liquid 74; the space located on the opposite side of the flexible wall 73 is adapted to communicate with the auxiliary chamber 66 which is filled with compressed gas.

The operation is the same as in the previous case and the reference pressure for the obturator is again the pressure which prevails within the auxiliary chamber 66; but there is less danger of leakage between the piston and the regulator body by reason of the presence of the liquid 74 above the hollow piston 61. This device is therefore of interest in the case of those hydraulic control circuits which have the highest pressures.

Figure 11:
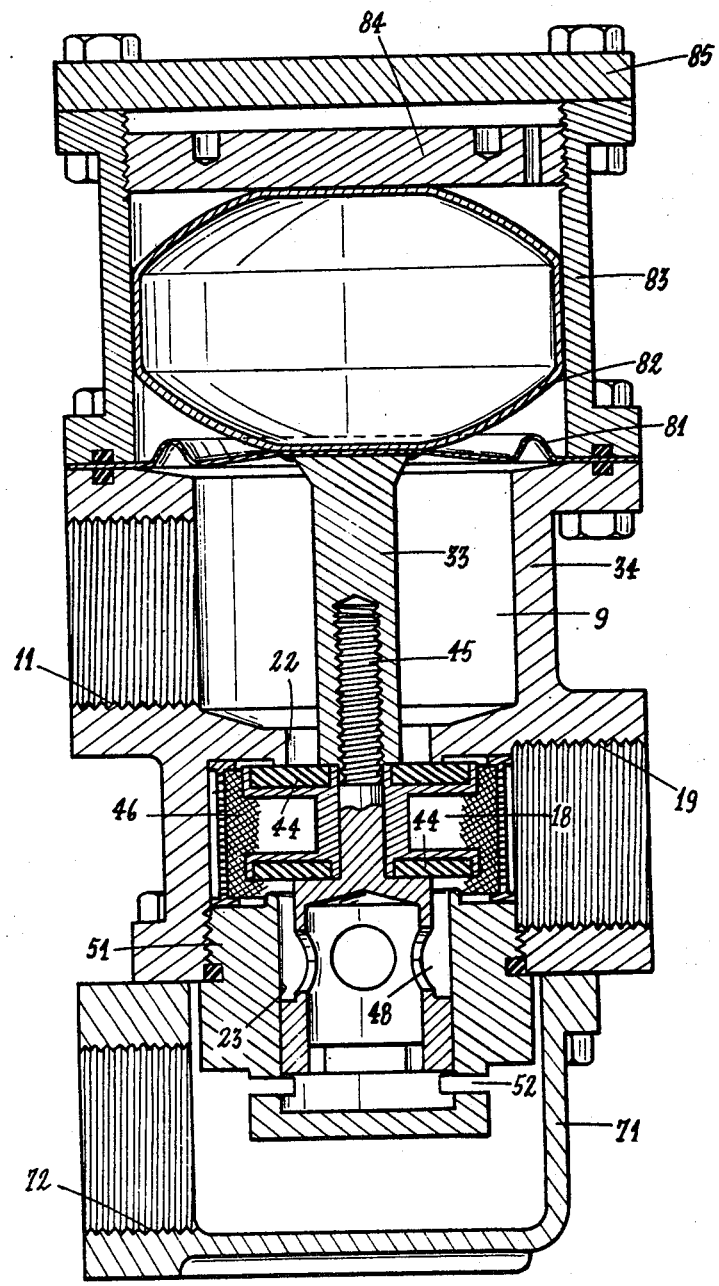
FIG. 11 shows a construction of a diaphragm-type regulator in the same position as the previous embodiments.

In the case of the embodiment which is illustrated in FIG. 11, the endpiece 33 to which the double valve 44 is fixed is secured to a diaphragm 81, said diaphragm being placed in contact with a metallic capsule 82 which is endowed with elasticity. The capsule 82 is housed within a cylinder 83 which is bolted onto the end of the regulator body 34. The peripheral portion of the diaphragm 81 is tightly clamped between the cylinder 83 and the body 34. A circular plate 84 is screwed into the end of the cylinder 83 so as to be placed in contact with the capsule 82 and constitutes an adjustable stop relative to this latter. The cylinder is closed by a protective cover 85.

In this embodiment, the pressure of the fluid contained within the measuring chamber 9 is exerted on the diaphragm 81 in opposition to the elastic force developed by the capsule 82 as a result of the deformation to which this latter is subjected by the plate 84. Said elastic force can be regulated by screwing the plate 84 to a greater or lesser extent within the cylinder 83. This method of adjustment can be carried out with particularly great ease and the corresponding construction is advantageous when compressed gas at a constant pressure is not available.

As will be readily understood, the metallic capsule can be replaced by another elastic body such as a rubber balloon, a spring, etc. Furthermore, these improvements can be utilized in applications other than those which have been contemplated in the foregoing.

I claim:

1. A regulator to control the pressure in a pressurized fluid circuit supplied by a pressure-elevating device such as a compressor, said regulator comprising:
   a measuring chamber having an outlet connected to said circuit,
   a pressure-sensing element disposed in said measuring chamber and having a wall subjected on one side to the pressure to be controlled in said circuit,
   means to exert on the other side of said wall of said sensing element a predetermined force opposing the pressure to be controlled in said circuit, said force being equal to the product of the effective area of said wall times a reference pressure,
   a regulating chamber having an inlet connected to said pressure-elevating device,
   a first valve port between said regulating chamber and said measuring chamber, and a second valve port between said regulating chamber and a low pressure discharge outlet, said two valve ports being disposed in oppositely facing relation,
   a two-position obturating member in said regulating chamber, said member being mechanically coupled with said pressure-sensing element and being arranged selectively to close said first or second valve port, according to whether the pressure to be controlled in said circuit is higher than a predetermined maximum or lower than a predetermined minimum,
   the ratio of the cross-sectional area of said first valve port to the effective area of said wall of said sensing element being equal to the ratio of the differences of said minimum pressure respectively to said reference pressure and to said low discharge pressure, and
   the ratio of the cross-sectional area of said second valve port to the effective area of said wall of said sensing element being equal to the ratio of the differences of said maximum pressure respectively to said reference pressure and to said low discharge pressure.

2. A regulator in accordance with claim 1, wherein said pressure-sensing element comprises a bellows-type diaphragm filled with a gas at said reference pressure and comprising an automatic closure-filling valve.

3. A regulator in accordance with claim 1, wherein said pressure-sensing element comprises a bellows-type diaphragm filled with a gas at said reference pressure and comprising an internal spacer for limiting the extension of said bellows and guides for said spacer to prevent twisting of said bellows.

4. A regulator in accordance with claim 1, wherein said discharge orifice of the regulating chamber opens into a reaction chamber having an orifice which provides communication with the atmosphere, and wherein means are provided for producing a time lag between connection of said reaction chamber to the atmosphere and opening of said discharge orifice of the regulating chamber.

5. A regulator in accordance with claim 4, wherein said reaction chamber is constituted by a cylinder in which a piston rigidly fixed to said obturating member is capable of displacement and wherein said cylinder has slots for communication with the atmosphere, said slots being sealed off by the piston and freed only when a predetermined time interval has elapsed after the beginning of the travel of said piston.

6. A regulator in accordance with claim 1, wherein said pressure-sensing element comprises a hollow piston having one face subjected to the pressure to be controlled in said circuit and its other face subjected to said reference pressure.

7. A regulator in accordance with claim 6, and comprising an auxiliary chamber filled with a gas at said reference pressure and adapted to communicate with said other face of said piston.

8. A regulator in accordance with claim 6, and comprising a flexible wall separating the inside volume of said hollow piston which is filled with a liquid from an enclosure filled with a gas at said reference pressure.

9. A regulator in accordance with claim 1, wherein said pressure-sensing element comprises a flexible diaphragm having one face subjected to the pressure to be controlled in said circuit and its other face engaging an elastically deformable metallic capsule that bears on an adjustable stop.